June 7, 1938.  L. J. BISHOP  2,120,052
CONVEYER
Filed Dec. 21, 1934   5 Sheets-Sheet 1
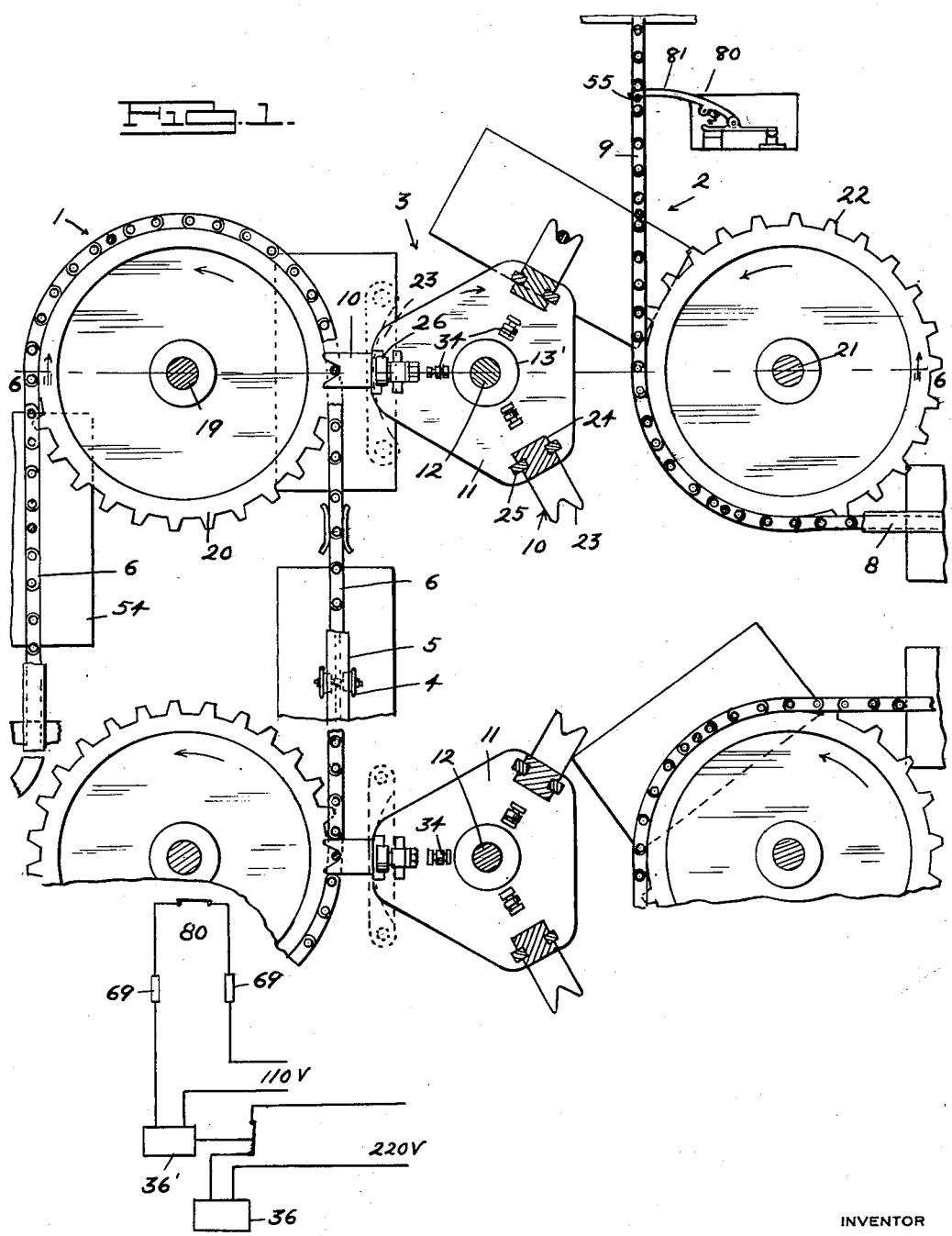
INVENTOR
LEONARD J. BISHOP
BY
ATTORNEYS

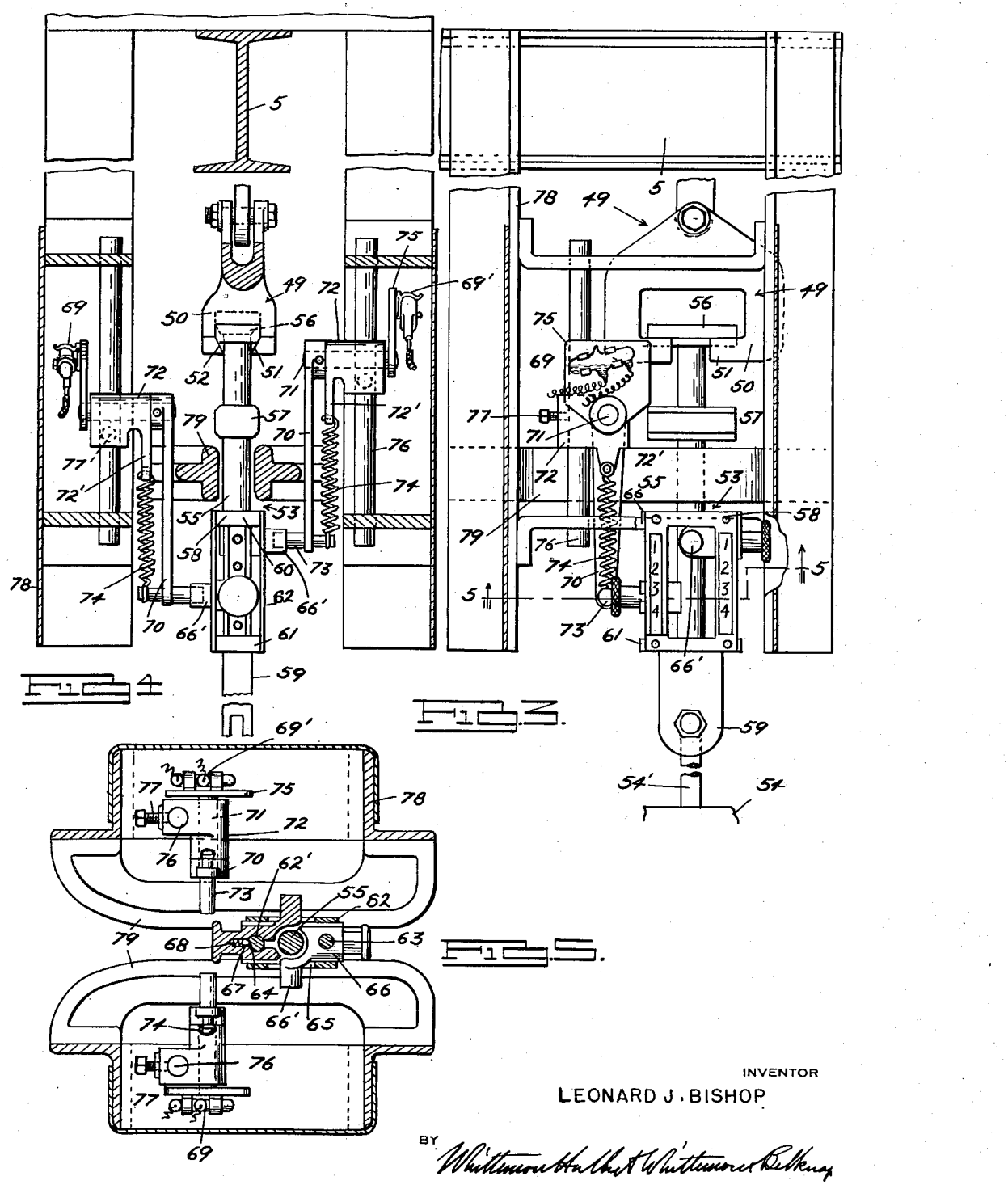

June 7, 1938.    L. J. BISHOP    2,120,052
CONVEYER
Filed Dec. 21, 1934    5 Sheets-Sheet 3
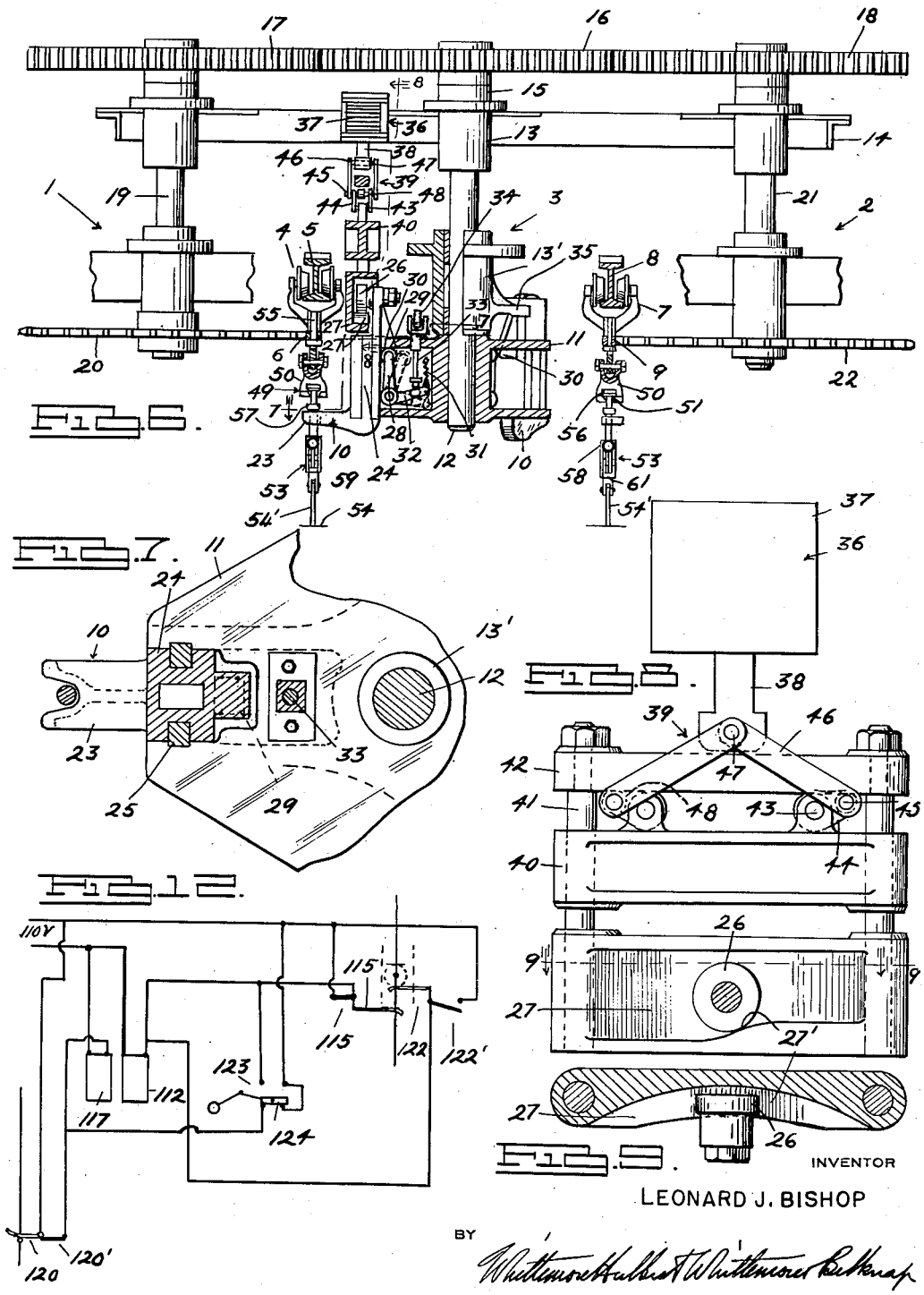
INVENTOR
LEONARD J. BISHOP
BY
ATTORNEYS

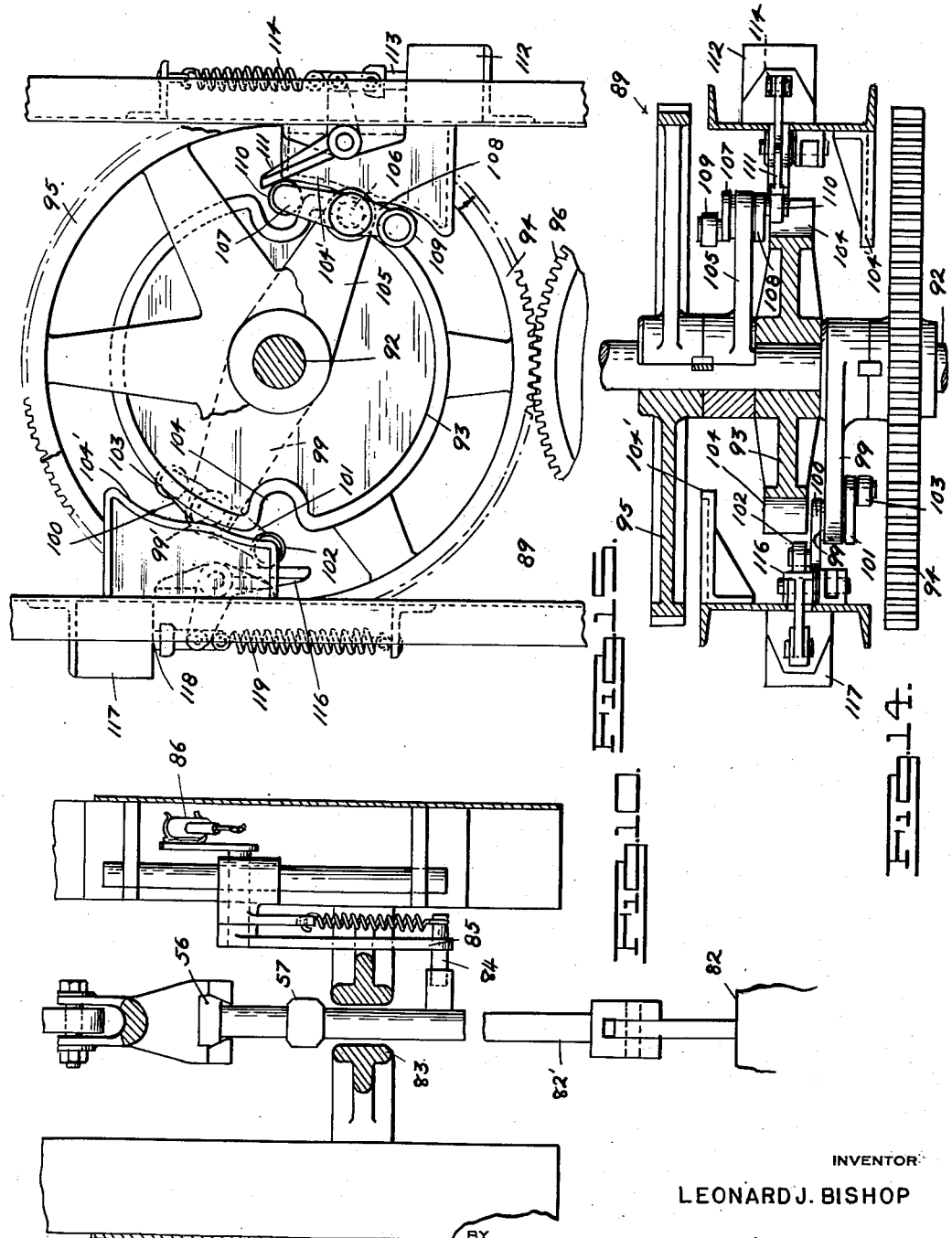

June 7, 1938.  L. J. BISHOP  2,120,052
CONVEYER
Filed Dec. 21, 1934  5 Sheets-Sheet 5
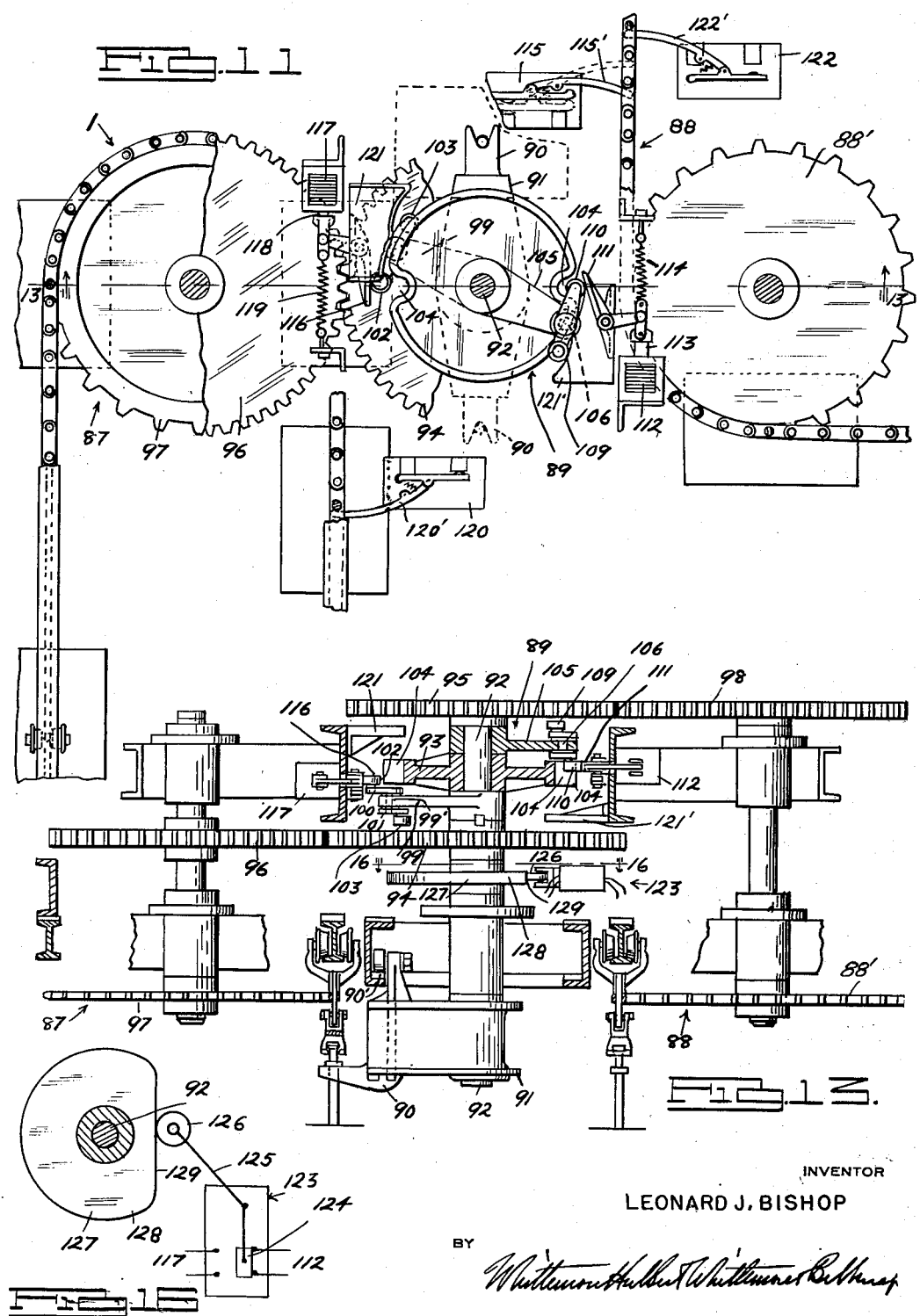
INVENTOR
LEONARD J. BISHOP
BY
ATTORNEYS Patented June 7, 1938

2,120,052

UNITED STATES PATENT OFFICE 2,120,052

CONVEYER

Leonard J. Bishop, Detroit, Mich., assignor to Mechanical Handling Systems, Inc., Detroit, Mich., a corporation of Michigan Application December 21, 1934, Serial No. 758,688

17 Claims. (Cl. 198—25)

The invention relates to work conveyers and has for some of its objects to provide an improved device for removing the work from a conveyer and to provide a device which removes the weight of the work from the conveyer prior to moving the work away from the path of the conveyer. Other objects are to provide an improved device for transferring the work from a loading conveyer to a receiving conveyer; to provide a device for transferring the work from a loading conveyer to a predetermined one of a number of receiving conveyers as controlled by a selector; and to provide a controller which is operable by work on each of the receiving conveyers to render the transfer device associated therewith inoperative.

These and other objects of the invention will become apparent from the following description, taken in connection with the accompanying drawings, in which Fig. 1 is a fragmentary plan view of a conveyer showing an embodiment of my invention;

Fig. 2 is a diagram of the electric circuit;

Fig. 3 is a front elevation, partly broken away, of a portion of Fig. 1;

Fig. 4 is an end elevation of Fig. 3;

Fig. 5 is a cross section on the line 5—5 of Fig. 3;

Fig. 6 is a cross section on the line 6—6 of Fig. 1;

Figs. 7 and 8 are cross sections on the lines 7—7 and 8—8 respectively of Fig. 6;

Fig. 9 is a cross section on the line 9—9 of Fig. 8;

Fig. 10 is a view similar to Fig. 4 illustrating a modification;

Fig. 11 is a fragmentary plan view showing another embodiment of my invention;

Fig. 12 is a diagram of the electric circuit;

Fig. 13 is a cross section on the line 13—13 of Fig. 11;

Fig. 14 is a view showing a portion of Fig. 13;

Fig. 15 is a plan view, with parts broken away, of Fig. 14;

Fig. 16 is a cross section on the line 16—16 of Fig. 13.

While the invention is applicable to work conveyers of various types, it is illustrated in conjunction with work conveyers of the overhead trolley type.

Referring generally to Figures 1 to 9 inclusive, 1 is the loading work conveyer and 2 are the receiving work conveyers. In the present instance two receiving work conveyers are shown, although a greater number may be employed. 3 are work transfer devices between the loading conveyer 1 and each of the receiving conveyers 2. 4 are trolleys of the loading conveyer, these trolleys being supported upon the track 5 and being advanced by a flexible linear connection such as the chain 6. 7 are the trolleys of each of the receiving conveyers, these trolleys being supported upon the tracks 8 and the trolleys upon each track being advanced by a flexible linear connection such as the chain 9. The spacing or pitch of the trolleys 4 in the present instance is equal to the spacing or pitch of the trolleys 7 and furthermore the trolleys of each of the conveyers are advanced at the same rate. Each of the transfer devices 3, as shown, has a plurality of transfer members 10 which are engageable with the work for carrying the same from the loading conveyer to one of the receiving conveyers. The peripheral spacing or pitch of these transfer members and their rate of advancement, which is along a circular line, is the same as the trolleys of any of the conveyers.

Each of the transfer devices 3 is constructed in the same manner and comprises the table 11 which is secured to the lower end of the shaft 12. The shaft is journaled in the upper and lower bearings 13 and 13' respectively which are supported in suitable framework 14. As shown, the shaft has secured to its upper end the collar 15 which is supported by the upper bearing 13. 16 is a gear secured to the upper end of the shaft above the collar and meshing with the gears 17 and 18. The gear 17 is connected through the shaft 19 with the sprocket 20 engaged by the chain 6 of the conveyer 1 and the gear 18 is connected through the shaft 21 with the sprocket 22 engaged by the chain 9 of the conveyer 2. The shafts 19 and 21 are journaled in bearings and supported in the same manner as the shaft 12. The loading conveyer 1 is preferably directly driven in any usual manner and it drives each of the transfer devices 3 and each of the receiving conveyers through sets of gears 17, 16 and 18. Each table 11 is rotated at the same angular rate as the sprockets 20 and 22 of the conveyers 1 and 2 inasmuch as the gears 16, 17 and 18 have the same pitch diameters.

The transfer members 10 of each transfer device 3 have at their lower ends the radially outwardly extending arms 23, each of which is preferably bifurcated at its radially outer end to register with and engage the work. The peripheral spacing or pitch of these bifurcated ends is the same as the spacing or pitch of the trolleys and with the above mentioned gearing their rate of advancement, which is along a circular line having a diameter equal to the pitch diameter of either of the gears 17 and 18, is the same as the trolleys. The transfer members are vertically movable relative to the table 11, each of these transfer members having the vertically extending body 24 which has vertically extending guideways in its opposite sides for receiving vertically extending guides 25 secured to the table. Each transfer member has at its upper end the roller 26 which is adapted during the rotation of the table to engage the cam 27 when this cam is in its raised position to thereby effect raising of the transfer member. The cam 27 when in its lowered position is inoperative to raise the transfer members, the rollers 26 of these transfer members merely passing over the cam and preferably not contacting therewith. For holding each transfer member in its raised position after its roller 26 becomes disengaged from the cam 27, there is the lever 28 pivotally mounted upon the table 11 and preferably having at its free end the roller 29 which is engageable with the shoulder 30 formed upon the body 24. This lever, as shown, is in the nature of a bell crank lever and it is yieldably urged in a direction to engage the roller 29 with the shoulder 30 by means of the coil spring 31 having its upper end connected to the table 11 and its lower end connected to the lever 32.

To disengage the roller 29 from the shoulder 30 to thereby permit lowering of the transfer member, I have provided the push rod 33 having its lower end engageable with the lever 32 and preferably having at its upper end the roller 34 located above the table and engageable with the cam 35, which latter is formed upon the lower bearing 13'. This push rod is guided by the table.

The table 11 is preferably made hollow to enclose the bell crank levers, the coil springs, and the major portions of the push rods, the guides 25 being secured to the upper and lower walls of the table and the push rods being guided by the upper wall only, or by a bushing upon the upper wall.

To raise the cam 27, I have provided the electro-magnet 36 having the stationary field 37 mounted upon the framework 14 and the vertically movable core 38. This core upon upward movement is adapted to raise the cam 27 through the toggle linkage 39. More in detail, 40 is a stationary member mounted upon the framework 14 below the electro-magnet and provided at its opposite ends with guideways for the vertical rods 41, which are secured at their lower ends to the cam 27 and at their upper ends to the plate 42, this plate being below the core 38. 43 are pins journaled in lugs at the upper side of the stationary member 40 and connected to the opposite ends of each of these pins are the links 44. 45 are pins extending through the opposite ends of the pairs of links 44 and the opposite ends of these pins 45 are connected to the links 46 which in turn are connected to the lower end of the core 38 by the pin 47. Upon each of the pins 45 and between the links 44 there are the rollers 48 which are engageable with the lower side of the plate 42. The links 44 and 46 form the toggle linkage 39 and the stroke of the core 38 is such that when the cam 27 has been raised to its uppermost and operative position the rollers 48 have their axes substantially vertically above the axes of the pins 43 so that any downward pressure exerted by reason of the rollers 26 engaging the cam is carried by the stationary member 40 instead of the core of the electro-magnet.

The cam 27 is positioned above the table 11 so that its effective cam surface 27' is adapted to engage the roller 26 when the bifurcated arm 23 of one of the transfer members 10 is substantially in full registration with the work so that the weight of the work may be safely removed from the trolley 4 of the conveyer 1. The effective cam surface of the cam 35 is positioned to engage the roller 34 when the bifurcated end of the transfer member and the work carried thereby are substantially in full registration with the trolley 7 of the conveyer 2 so that the weight of the work may be safely transferred to the trolley 7.

The trolleys 4 of the loading conveyer 1 and the trolleys 7 of the receiving conveyers 2 are all formed in the same manner each having a work supporting portion 49 having the downwardly extending furcations 50. Each of these furcations has at its lower end and edges the lugs 51 which extend toward the lugs on the other furcation, but are spaced therefrom a sufficient distance to provide for insertion or removal of the work therebetween. The lugs upon each furcation have the downwardly and inwardly extending faces 52 which are spaced from each other and which are adapted to cooperate with the work to center the same upon the work supporting portion. The openings between the lugs 51 of each of the furcations 50 extend transversely of the path of travel of the trolleys, so that the transfer device during the continued movement of both the trolleys and the transfer device may remove the work from the trolleys of the loading conveyer and transfer the work to the trolleys of one of the receiving conveyers.

The work of the conveyer of Figs. 1 to 9 inclusive comprises work pieces, each of which comprises the selector 53 and the article 54, the latter being suspended from the former. The selectors are constructed in the same manner and each comprises the vertical rod 55 having the head 56 at its upper end and the enlargement 57 spaced beneath the head and having its lower face engageable with the bifurcated ends of the arms 23 of the transfer members 10. The selector also has spaced beneath the enlargement 57 the frame 58 and below this frame the clevis 59 for securement to the article 54. As shown, the clevis 55 is detachably connected to the carrier 54' for the article proper. The head 56 has the lower portions of its side faces converging to engage the faces 52 of the lugs 51 upon the work supporting portions 49 of the trolleys. The frame 58 is preferably formed of the upper and lower bars 60 and 61 respectively, which are rigidly secured to the rod 55, and the rectangular side plates 62 extending between and secured to the bars 60 and 61. There are also the vertical rods 62' and 63 extending between the upper and lower bars 60 and 61 and spaced from the rod 55. These rods 62' and 63 are preferably provided with the recesses or notches 64 which are spaced longitudinally thereof, there being in the present instance four of these recesses or notches in each rod. 65 are a pair of selector members, there being one for each of the rods 62' and 63. Each selector member has the body 66 sleeved upon one of the rods 62' and 63 and the lateral arm 66', which latter projects through the opening in one of the rectangular plates 62. For yieldably holding each selecting member in its vertically adjusted position upon its rod, I have provided the ball 67 which is urged by the coil spring 68 toward its rod so that when this ball registers with one of the recesses or notches it will be forced into engagement therewith.

With this arrangement of selector, it will be seen that each of the selecting members in the present instance may assume any one of four positions so that as a result sixteen selective positions are provided for in the combination. As a result, sixteen receiving work conveyers may be used in conjunction with the one loading work conveyer and it is obvious that by increasing the number of vertical positions that may be occupied by each selecting member the number of receiving work conveyers may also be increased.

69 and 69' are switches which are in the circuit including the electro-magnet 36. As shown, these switches control an electro-magnet 36' which in turn controls the electro-magnet 36. These switches are arranged to be closed by the work and more particularly by the selector sufficiently in advance of the substantially complete registration of one of the transfer members 10 with the rod 55 below the enlargement 57 to permit the cam 27 being raised to its uppermost and operative position before the roller 26 of this transfer member comes into operative relation thereto. Each of the switches, as shown, is a mercury switch which is adapted to be swung to close the electric circuit therethrough by the lever 70. This lever, as shown, is secured at its upper end to the pin 71 which is journaled in the support 72 and the lower end of this lever has secured thereto the lateral pin 73 which is adapted to be positioned for contact with one of the lateral arms 66' of the selector. For holding the lever 70 in its normal position, there is the coil spring 74 connected to the lower end of the lever 70 and to the arm 72' of the support. The end of the pin 71 opposite the lever 70 has secured thereto the plate 75 which carries the mercury switch. The support 72 is sleeved upon the vertical rod 76 and it is adapted to be secured thereto by suitable means such as the set screw 77. The rods 76 are carried by the framework 78 which is secured to and depends from the framework for carrying the track 5.

With this arrangement, it will be seen that the levers 70 may be vertically adjusted so that their pins 73 will normally occupy predetermined positions corresponding to predetermined positions of the lateral arms 66' of the selector. As a result, by selecting the vertical positions of the lateral arms of the selectors and also by selecting the vertical positions of the lateral pins of the levers, the operation of a number of transfer devices may be automatically controlled, it being apparent that when one only of the levers 70 is swung the electro-magnet circuit remains open and the electro-magnet is not energized.

For the purpose of guiding the selectors in their travel so that their lateral arms will be in a position to engage the lateral pins of the levers, I have provided the curved guides 79 which are mounted upon the framework 78 and which are spaced apart a distance sufficient to provide for the passage of the rod 55, these guides being positioned to engage that portion of the rod below the enlargement 57 and above the frame 58.

To prevent the transfer of the work from a trolley of the loading work conveyer to a trolley of any one of the receiving work conveyers in the event that the latter trolley is already carrying work, I have provided the switch 80 which is also in the electro-magnet circuit. This switch has the arm 81 which is preferably engageable by the rod 55 below the enlargement 57 and which is adapted to be swung to open the switch to hold the same open at the time the switches 69 and 69' would normally be closed.

In the modification shown in Figure 10, the work comprises the article proper 82 and its carrier 82', which latter has on its rod a head and an enlargement corresponding to the head 56 and the enlargement 57 respectively of the above described modification. The portion of the rod sufficiently below the enlargement to be below the guides 83 has a lateral arm which is directly engageable with the lateral pin 84 of the lever 85 for swinging the mercury switch 86 there being but one mercury switch required. The mounting of the mercury switch and the lever is the same as that above described. This construction is designed for use where there is but one receiving work conveyer.

In the modification shown in Figs. 11 to 16 inclusive, the loading work conveyer 87 and the receiving work conveyer 88 are driven independently of each other, instead of with each other, as in the previous modifications. These conveyers may have difference in spacing or pitch of the trolleys or difference in rate of advancement, or a combination of both, resulting in a difference in rate of advancement of the trolleys of the conveyer. As shown in the present instance, the rates of advancement of the two conveyers are different, the spacing or pitch of the trolleys of the two conveyers being the same. The construction of both conveyers 87 and 88 is the same as that of the conveyers previously described. However, the construction of the work transfer device 89 differs from that of the work transfer device 3 in that the work transfer device 89 has but one transfer member 90 in the present instance. This transfer member is constructed in the same manner as the transfer member 10 and it is adapted to be raised, held in raised position, and permitted to lower by gravity by the arcuate cam 90' which is supported in fixed position in any suitable manner as by the framework supporting the conveyers. This cam has its cam faces positioned to raise the transfer member when in registration with the work upon a trolley of the loading conveyer, to hold the transfer member in raised position until the transfer member and the work carried thereby is in registration with a trolley of the receiving conveyer and then to allow the transfer member to lower.

Another difference between this construction and the constructions previously described resides in the means for rotating the transfer device 89 and advancing its transfer member 90. This means is so constructed that the transfer device is intermittently rotated and the rate of advancement of the transfer member during its movement toward and away from the loading conveyer 87 is the same as that of the trolleys of this conveyer, while the rate of advancement of the transfer member during its movement toward and away from the receiving conveyer is the same as that of the trolleys of this conveyer. To accomplish this, the table 91 is positively connected through the shaft 92 to the pocket member 93. This pocket member is adapted to be rotated alternately by the gears 94 and 95 through suitable intermediate mechanism. Both of these gears are preferably journaled upon the shaft 92. The gear 94 meshes with and has the same pitch diameter as the gear 96 which is driven with the sprocket 97 engaged by the chain of the conveyer 87 and the gear 95 meshes with and has the same pitch diameter as the gear 96 which is driven with the sprocket 88' engaged by the chain of the conveyer 88. The pitch diameters of the gears and sprockets and the radius of the work engaging portion of the transfer member are such that the work engaging portion is advanced at the same rate as the trolleys of the loading conveyer 87 when the driving is being effected through the gears 96 and 94 and at the same rate as the trolleys of the receiving conveyer 88 when the driving is being effected through the gears 98 and 95. The connecting device between the gear 94 and the pocket member 93 comprises the arm 99 rotatable with the gear 94 and in synchronism with the spacing or pitch of the trolleys of the loading conveyer. The arm 99 has the shaft 99' journaled in its outer end. The connecting device also comprises the oppositely extending arms 100 and 101 fixed to the shaft 99' at the upper and lower sides respectively of the arm 99 and respectively carrying at their free ends the rollers 102 and 103. The roller 102 is adapted to engage in the lower zone of one of the diametrically opposite pockets 104 in the periphery of the pocket member 93. The connecting device between the gear 95 and the pocket member 93 is constructed in the same manner and comprises the arm 105 rotatable with the gear 95 and in synchronism with the spacing or pitch of the trolleys of the receiving conveyer. The arm 105 has the shaft 106 journaled in its outer end. The connecting device also comprises the oppositely extending arms 107 and 108 fixed to the shaft 106 at the upper and lower sides respectively of the arm 105 and respectively carrying at their free ends the rollers 109 and 110. The roller 110 is adapted to engage in the upper zone of one of the pockets 104. Both of the rollers 102 and 110 when forced into engagement with the pockets normally remain in engagement therewith until they are forcibly removed.

The transfer member 90 when at rest occupies either the position shown in full lines or the position shown in dotted lines in Fig. 11, the transfer member being respectively raised and lowered in the two positions. However, the gears 94 and 95 and their respective arms 99 and 105 continuously revolve in timed relation to the loading and receiving conveyers respectively.

To effect advancement of the transfer member 90 from the position shown in full lines to the position shown in dotted lines, I have provided means controlled by a trolley of the receiving conveyer 88. This means comprises the bell crank lever 111 having one arm positioned to engage the roller 110 only to force the same into the adjacent pocket 104, the electro-magnet 112 having its core 113 connected to the other arm of the bell crank lever, and the coil spring 114 which is also connected to the other arm of the bell crank lever. The bell crank lever, the electro-magnet and the coil spring are all mounted upon suitable framework which is carried from the framework carrying the track of the receiving conveyer 88. The core of the electro-magnet upon energization of the electro-magnet is adapted to swing the bell crank in a direction away from the pocket member 93, while the coil spring is adapted to swing the bell crank in a direction toward the pocket member. 115 is a switch which has an arm 115' adapted to be temporarily contacted by a trolley of the receiving conveyer 88 to temporarily open the circuit to the electro-magnet 112 at a time during the advancement of the trolley of the receiving conveyer, such that the transfer member 90 will be swung so that it and the work carried thereby will register with the trolley. It will be seen that when the circuit is opened the associated coil spring 114 through the bell crank lever 111 compels the roller 110 to engage in the adjacent pocket 104 of the pocket member 93 so that this pocket member will be rotated. The opening of the circuit occurs when the roller 110 registers with the adjacent pocket 104 so that the bell crank lever immediately forces the roller into the pocket. The rotation continues through 180 degrees and is stopped by reason of the roller 109 coming into contact with the cam 121, which latter is mounted on the framework and compels the roller 110 to move out of the pocket.

Assuming the transfer member 90 to be in the position indicated by dotted lines, the advancement of this transfer member is effected by the bell crank lever 116 having one arm positioned to engage the roller 102 only to force the same into the adjacent pocket 104. This device also comprises the electro-magnet 117 having the core 118 connected to the other arm of the bell crank lever, and the coil spring 119 also connected to the other arm of the bell crank lever. The bell crank lever, the electro-magnet and the coil spring are mounted and operate in the same manner as those previously described. 120 is a switch in the same circuit as the electro-magnet 117 and having an arm 120' adapted to be temporarily engaged by the work carried by one of the trolleys of the loading conveyer 87 to temporarily open the circuit at a time such that the roller 102 registers with the adjacent pocket 104 and such that the transfer member 90 will be swung from its position indicated in dotted lines to register with the work carried by this trolley and to receive the work. The opening of the circuit occurs when the roller 102 registers with the adjacent pocket 104. The movement will continue until the roller 103 comes into engagement with the cam 121' which is mounted on the framework and compels the roller 102 to move out of the pocket.

To avoid advancement of the transfer member 90 from the position shown in full lines to the position shown in dotted lines when the trolley of the receiving conveyer which would receive the work during this advancement is already carrying work, I have provided the switch 122. This switch is at a lower level than the switch 115 and has an arm 122' which is adapted to be temporarily engaged by the work carried by the trolley to close a second circuit including the electro-magnet 112 preferably slightly prior to opening of the switch 115 and while this switch remains open. As a result, the electro-magnet 112 remains energized so that the transfer member 90 is not operatively connected to the receiving conveyer 88.

The switches 115, 120 and 122 are preferably constructed in the same manner as the switch 80, which latter, as shown, is a standard type of limit switch.

For the purpose of preventing the rollers 102 and 110 from being simultaneously forced into engagement with the pockets 104 and damaging the transfer device, I have provided the cam controlled switch 123 having one pair of terminals in a second circuit including the electro-magnet 117 and another pair of terminals in a third circuit including the electro-magnet 112. These pairs of terminals are adapted to be alternately bridged by the contact member 124, which is actuated by the pivotal arm 125 having the roller 126 engageable with the cam 127, the construction being particularly illustrated in Fig. 16. The cam is fixed upon the shaft 92 below the gear 94 and has as shown the surface 128 concentric with the axis and the flattened surface 129, these surfaces being engageable with the roller 126. The cam is secured to the shaft so that when the transfer member 90 is in the position indicated in full lines and the arms 99 and 105 are in the position shown in Fig. 11, the roller 126 is in engagement with the cam surface 128 and the movable contact member 124 is in the position indicated in full lines in Figs. 12 and 16 to close the circuit including the electro-magnet 117 and to open the circuit including the electro-magnet 112. As a result, the electro-magnet 117 remains in a closed circuit so that its associated bell crank lever can not be operated to force the roller into a pocket of the pocket member, regardless of the opening of the switch 120. When the transfer member 90 is in the position indicated in dotted lines and the arms are in the position shown in Fig. 11, the roller 126 is in engagement with the flattened cam surface 129 and the movable contact member 124 is in the position indicated in dotted lines in Figs. 12 and 16 to close the circuit including the electro-magnet 112 and to open the circuit including the electro-magnet 117. As a result, the electro-magnet 112 remains in a closed circuit so that its associated bell crank lever can not be operated to force the roller into a pocket of the pocket member regardless of the opening of the switch 115. It will thus be seen that both rollers 102 and 110 can not be simultaneously forced into the pockets of the pocket member to operatively connect the transfer device to both conveyers.

While I have illustrated but one receiving conveyer in the modification illustrated in Figs. 11 to 16 inclusive, it is apparent that a number of receiving conveyers may be employed and that the work carried by the loading conveyer may be selectively transferred to the receiving conveyers in the same manner as illustrated in Figs. 1 to 9 inclusive, in which case the selectors and the proper selector switches of these latter figures would be used.

What I claim as my invention is:

1. The combination with a work conveyer, of a member movable toward and away from the path of said conveyer, said member being adapted to register with and to engage the work, means comprising a cam for raising said member when in registration with the work to remove the weight of the work from said conveyer, said raising means also comprising a device for raising said cam to operative position, and means for holding said member in raised position after its disengagement from said cam and during a portion of its movement away from the path of said conveyer.

2. The combination with a loading work conveyer and a receiving work conveyer, of a member movable between said conveyers, said member being adapted to register with and to engage the work on said loading conveyer, means for raising said member when in registration with the work on said loading conveyer to remove the weight of the work from said loading conveyer, said raising means comprising a cam and means for raising said cam, means for holding said member in raised position during its movement from said loading conveyer to said receiving conveyer, and means operable by work on said receiving conveyer for rendering said cam raising means inoperative.

3. The combination with a work conveyer, of a rotating table, a member rotatable with said table and movable vertically relative thereto, said member being adapted to register with and to engage the work, means for raising said member during the rotation of said table when said member is in registration with the work to remove the weight of the work from said conveyer, and means separate from said raising means carried by and movable with said table for holding said member in raised position during a subsequent portion of the rotation of said table.

4. The combination with a work conveyer, of a rotating table, a member rotatable with said table and movable vertically relative thereto, said member being adapted to register with and to engage the work, means for raising said member during the rotation of said table when said member is in registration with the work to remove the weight of the work from said conveyer, means separate from said raising means carried by and movable with said table for holding said member in raised position during a subsequent portion of the rotation of said table, and means for releasing said holding means.

5. The combination with a work conveyer, of a rotating table, a member rotatable with said table and movable vertically relative thereto, said member during rotation of said table being adapted to register with and to engage the work, a cam for raising said member when in registration with the work to remove the weight of the work from said conveyer, a pivotal lever carried by said table and engageable with said member to hold the same in raised position after its disengagement from said cam and a rod carried by said table for releasing said lever.

6. The combination with a work conveyer, of a member movable toward and away from the path of said conveyer, said member being adapted to register with and to engage the work, a cam for raising said member when in registration with the work to remove the weight of the work from said conveyer, means for raising said cam and holding the same in operative position, and a selector forming part of the work and controlling the operation of said cam raising means.

7. The combination with a loading work conveyer and receiving work conveyers, of a transfer device between said loading conveyers and each of said receiving conveyers, each transfer device comprising a transfer mmeber adapted to carry the work from said loading conveyer to the receiving conveyer with which said transfer device is associated, the work on said loading conveyer comprising means for selectively controlling the operation of said transfer devices, and means associated with each of said receiving conveyers and operable by work thereon to render the respective transfer device inoperative.

8. The combination with a loading work conveyer and receiving work conveyers, of a transfer device between said loading conveyers and each of said receiving conveyers, each transfer device comprising a transfer member adapted to carry the work from said loading conveyer to the receiving conveyer with which said transfer device is associated, means associated with each transfer device for automatically controlling the operation thereof, a selector forming part of the work on said loading conveyer for controlling the operation of said means, and means associated with each of said receiving conveyers and operable by work thereon to render the respective transfer device inoperative.

9. The combination with a conveyer of the overhead trolley type, of a selector detachably suspended from a trolley and adapted to carry an article, said selector having a plurality of vertically adjustable lateral arms, a transfer device movable toward and away from the path of said conveyer and engageable with said selector, adjustable means for raising said transfer device when in engagement with said selector, and members engageable by said selector arms for controlling the operation of said adjustable means.

10. The combination with a work conveyer, of a member movable toward and away from the path of said conveyer, said member being adapted to register with and engage the work, a device for raising said member when in registration with the work to remove the weight of the work from said conveyer, and mechanism separate from said device and movable with said member as a unit toward and away from the path of said conveyer and engageable with said member in the raised position thereof for holding the same raised during a portion of the movement of said member away from the path of said conveyer, and means for disengaging said mechanism from said member when the latter is spaced from the path of said conveyer.

11. The combination with a work conveyer, of a member movable toward and away from the path of said conveyer, said member being adapted to register with and engage the work, means comprising an element for raising said member when in registration with the work to remove the weight of the work from said conveyer, said raising means also comprising a device for moving said element to operative position, and means for holding said member in raised position during a portion of its movement after its disengagement from said element.

12. The combination with a work conveyer, of a member movable toward and away from the path of said conveyer, said member being adapted to register with and engage the work, means comprising a cam element for raising said member when in registration with the work to remove the weight of the work from said conveyer, said raising means also comprising a device for moving said cam element to operative position, and means operable by the work on said conveyer for controlling the operation of said moving device.

13. The combination with a loading work conveyer and a receiving work conveyer, of a member movable between said conveyers, said member being adapted to register with and engage the work on said loading conveyer, means for raising said member when in registration with the work on said loading conveyer to remove the weight of the work from said loading conveyer, said raising means comprising an element and means for moving said element to operative position, means operable by the work on said loading conveyer for controlling the operation of said moving means, and means operable by the work on said receiving conveyer for rendering said moving means inoperative.

14. The combination with a conveyer and a trolley associated therewith, said trolley having downwardly extending furcations and lugs upon said furcations extending toward each other and spaced apart longitudinally of the path of said trolley to provide a passage for work, a member engageable with the work and movable transversely of the path of said trolley for carrying the work through the passage, said member being vertically movable when the work is in registration with said lugs.

15. The combination with a trolley for carrying work having a head at its upper end, said trolley having work supporting parts laterally spaced from each other to provide a lateral passage for the work, and a member adapted to engage the work in a zone spaced vertically from said work supporting parts, said member being movable to conduct the work through the passage.

16. The combination with a loading work conveyer and a receiving work conveyer and trolleys associated with said conveyers, each of said trolleys having work supporting parts spaced laterally from each other and providing a passage for work therebetween and also cooperating means for supporting work therebetween, of a transfer device between said conveyers operable to remove the work from a trolley of said loading work conveyer through the passage between the work supporting parts of said trolley and to transfer the work to a trolley of said receiving work conveyer through the passage between the work supporting parts of said last mentioned trolley.

17. The combination with a work conveyer, of a member movable toward and away from the path of said conveyer, said member being adapted to register with and engage the work, means for moving said member in said manner, a device for raising said member when in registration with the work to remove the weight of the work from said conveyer, means operable independently of said first mentioned means for moving said device to operative position, and selective means associated with the work on said conveyer for controlling the operation of said last mentioned moving means.

LEONARD J. BISHOP.